UNITED STATES PATENT OFFICE.

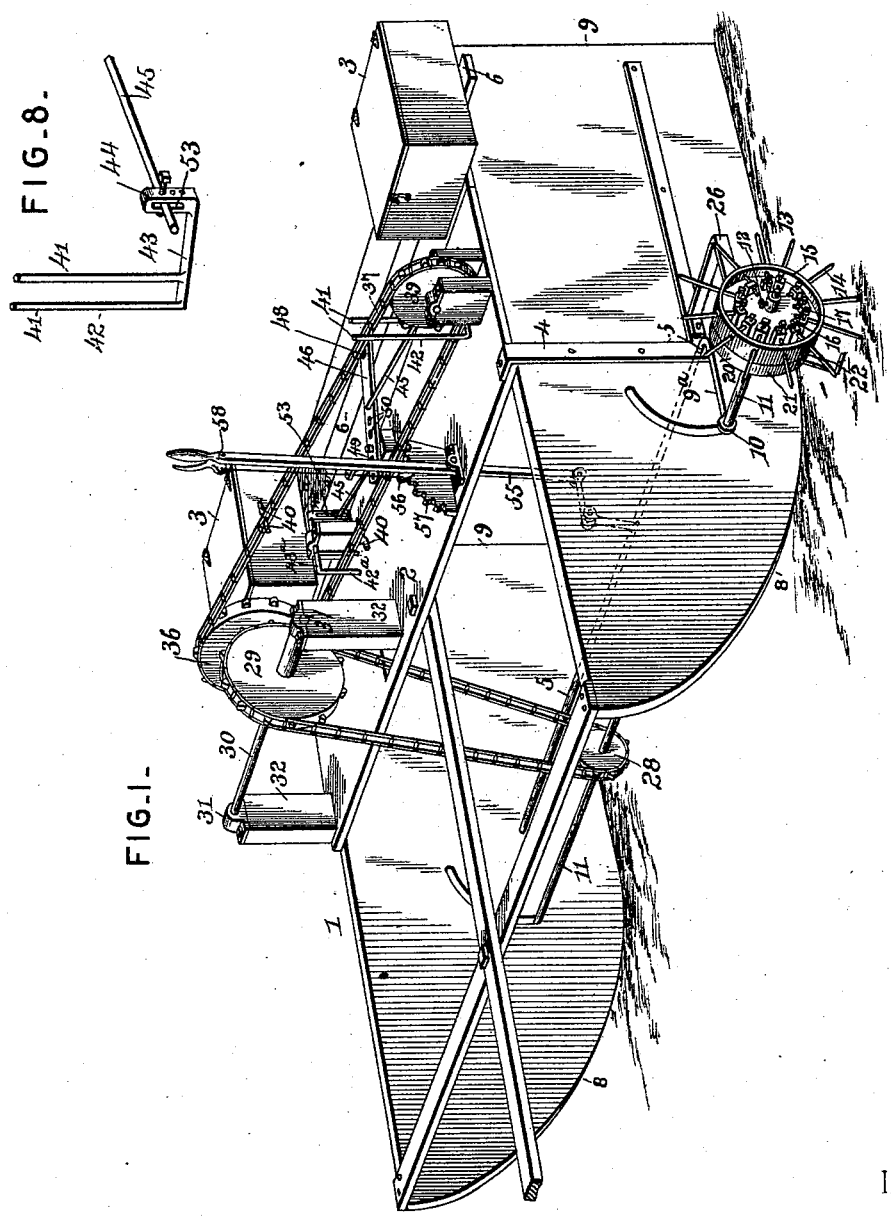

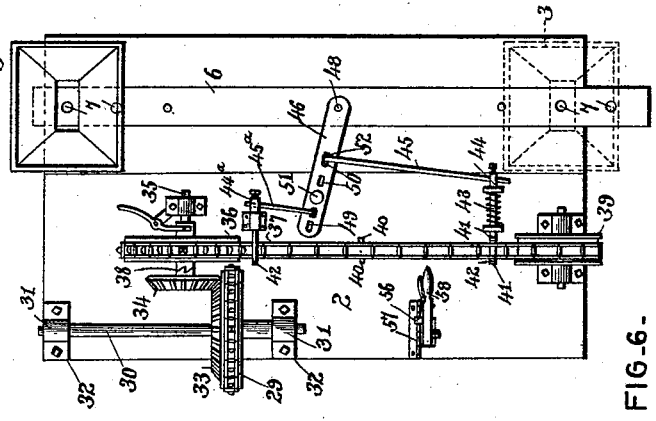

ORLAN T. WOOD, OF PLATTSMOUTH, NEBRASKA, ASSIGNOR TO PHILLIP V. McCULLEY AND ANNA WOOD, OF SAME PLACE.

CHECK-ROW CORN-PLANTER.

SPECIFICATION forming part of Letters Patent No. 527,824, dated October 23, 1894.

Application filed March 26, 1894. Serial No. 505,168. (No model.)

*To all whom it may concern:*

Be it known that I, ORLAN T. WOOD, a citizen of the United States, residing at Plattsmouth, in the county of Cass and State of Nebraska, have invented a new and useful Check-Row Corn-Planter, of which the following is a specification.

My invention relates to corn-planters, and to check-rower attachments therefor, the objects in view being to provide a simple, inexpensive, and efficient device adapted to be attached to any ordinary corn-planter; to provide means for signaling the planting of each hill; to provide simple means for checking the operation of the parts in turning and in moving to and from the field; and, furthermore, to provide means of adjustment whereby the marker-wheel may be set to bring the marker opposite the hill and cause the operation of the signal at the moment of planting the hill, irrespective of the initial relative positions of the slide operating and marking mechanisms.

Further objects and advantages of the invention will appear in the following description, and the novel features thereof will be particularly pointed out in the appended claims.

In the drawings:—Figure 1 is a perspective view of a check-rower attachment embodying my invention applied in the operative position to a corn-planter. Fig. 2 is a rear view. Fig. 3 is a plan view. Fig. 4 is a detail section of one of the operating or spike wheels. Fig. 5 is a detail view of one of the operating wheels. Fig. 6 is a similar view of one of the markers. Fig. 7 is a detail view of the hand-hook for setting the marker-wheels. Fig. 8 is a detail view showing the connection between the check-row lever and the pitman whereby motion is communicated to the oscillating lever.

Similar numerals of reference indicate corresponding parts in all the figures of the drawings.

1 designates the framework of the attachment, consisting essentially of a transverse platform 2, which has arranged in advance of the seed-boxes 3 depending angular brackets 4 which are secured at their upper ends to the side edges of the platform, and a transverse rock-shaft 5 which is journaled in bearings at the angular portions of said brackets. The framework thus constructed is adapted to be attached, with the parts carried thereby and forming the subject matter of my invention, to any ordinary corn-planter, such as I have illustrated in the drawings, said corn-planter being provided with the usual seed-boxes as above mentioned and a slide 6 which extends under the outlet openings of said seed-boxes and is provided with feed openings 7 adapted to register with the outlet openings of the seed-boxes. The feed openings are preferably provided in pairs, whereby one opening of each pair is in registration with the outlet opening of a seed-box at either limit of the movement of the slide.

The corn planter proper is provided with the usual shoes 8 and seed-chutes 9, which communicate with and receive seed from the outlet openings of the seed-boxes.

The above described platform and depending angular brackets form the means of attachment of my improved check-rower to the corn-planter proper, and the terminal crank-arms $9^a$ of the rock-shaft 5 are provided at their front extremities with bearings 10, in which is mounted the transverse drive-shaft 11.

Fixed by means of set-screws 12 to the drive-shaft near its ends are the operating or spike-wheels 13, having radially disposed spikes 14, which are adjustably secured to the body-portions 15 of the wheels by means of sockets or keepers 16 and set-screws 17. These operating or spike-wheels are provided upon their inner sides with pivoted pawls 18 having the actuating springs 19, and loosely mounted upon the drive-shaft adjacent to the inner side of each operating or spike-wheel is a marker-wheel 20 provided with a ratchet flange 21, adapted to be engaged by the pawl of the contiguous operating wheel, whereby the markers may be turned independently of the operating shaft to arrange their markers 22 opposite the first hills when the machine is started, as hereinafter more fully explained. The marker 22 is adjustably fitted to the body-portion of the marker-wheel by means of a set-screw 23, whereby the projection or extension of the marker may be regulated to suit the character of the soil. It is necessary in the adjustment both of the markers and of the spikes of the operating wheels to extend them farther when the soil is well worked and loose, than when it is hard. Each marker wheel is provided in addition to the marker with a signal projection 24 arranged approximately at a distance of ninety degrees from the marker proper, and adjustably upon the periphery of the marker-wheel by means of a set-screw 25, and secured to the adjacent angular bracket is a signal spring 26 having a loose or free outer end arranged in the path of said signal projection and adapted to be engaged thereby at each rotation of the marker-wheel. This signal projection is rounded as shown to force the free end of the signal spring from the plane of the marker-wheel, and said projection is further provided with a square shoulder 27, whereby the end of the spring is released suddenly and is caused by its resilience to strike the marker-wheel, thus giving notice of the fact that the hill has been planted. The marker-wheel should be adjusted upon the operating shaft, so as to cause the marker proper to impress the surface of the soil at the side of the hill, thus indicating the position of the latter, and the signaling device should be arranged so as to announce the planting of a hill just as the marker impresses the soil beside the hill. This adjustment is possible by the rotation of the marker wheel independently of the operating shaft.

The operating shaft is provided with a sprocket pinion 28 which is connected to the sprocket wheel 29 carried by a shaft 30 which is mounted in bearings 31 at the upper ends of standards 32 supported by the platform, and said sprocket-wheel is provided at one side with a miter-gear 33, which meshes with a similar gear 34 fixed to the longitudinally disposed shaft 35. This shaft supports the driving sprocket 36 of the check-row chain 37, said sprocket being connected with the shaft by means of a clutch 38, whereby the check-row chain and its driving sprocket may be operated independently of the other parts of the mechanism to secure adjustment between the planting and marking mechanisms. The check-row chain is carried at the opposite side of the platform around an idle pulley 39, and is provided at intervals with lateral projections or studs 40 to engage the parallel arms 41 of the bifurcated end of the check-row lever 42, said arms being normally arranged upon opposite sides of the check-row chain. This check-row lever is secured to a rock-shaft 43 having an arm 44 which is connected by a rod or pitman 45 with the oscillating lever 46. A similar reversed check-row lever 42ᵃ carried by a rock-shaft 43ᵃ and having an arm 44ᵃ, which is connected by a rod 45ᵃ to the oscillating lever 46, is arranged adjacent to the other seed box. The oscillating lever 46 is fulcrumed in a horizontal position upon the platform, and is provided at its free rear end with a perforation to engage a vertically disposed pin 48 upon the seed-slide, and the lever is provided with longitudinal slots 49 and 50, whereby the pivotal points 51 upon which the lever is mounted and the pivotal connections 52 by which the rods or pitmen are attached thereto, may be adjusted to vary the throw of the lever. The arms 44 and 44ᵃ are slotted, as shown at 53, for the reception of the extremities of the connecting rods or pitmen, 45, 45ᵃ thus providing an additional means of adjustment to regulate the throw of the oscillating lever, and hence of the seed-slide.

The rock-shaft 5 is provided at an intermediate point with an arm 54, to which is connected the lower end of an elevating lever 55, whereby the operating shaft with the operating-wheels and marking wheels carried thereby may be elevated out of contact with the surface of the ground when it is required to check the operation of the mechanism. This elevating lever is provided with locking means to uphold it in its adjusted positions, such locking means consisting of a pawl 56 engaging a segmental rack 57 and connected to an operating handle 58.

This being the construction of my invention, the operation thereof is as follows:—It is desirable in planting to select a straight end of the field as a starting point in order that the first row may be straight, and thus form a suitable guide for the subsequent rows. Having arranged the machine with its seed-shoe exactly in the desired position for the initial point of a row, the check-row or dropper chain should be turned forward or in the direction in which it is moved when the machine is in operation to cause the reciprocation of the seed-slide and the planting of a hill at said initial point. The marker wheels should then be adjusted before the machine is started to cause the marker proper to occupy a position beside said hill, thus bringing the signal projection just beyond the signal spring. Having thus adjusted the parts and arranged the projection of the spikes of the operating wheels and the marker proper on the marker-wheel to suit the character of the soil, the machine is ready for operation.

It will be seen that in case of obstructions the operating shaft carrying the wheels and markers may be elevated without delay, and that in case the signal does not indicate precisely the moment of depositing the seed in the hill, further adjustment may be made to bring about the proper relation between the parts. In order to facilitate this subsequent adjustment of the marker wheels I preferably provide the latter upon their inner surfaces with a series of studs 59, which are adapted to be engaged by any suitable device, such as a hooked rod which may be carried upon the machine and kept within convenient reach of the operator.

As above described, the mechanism for operating the seed slide is mounted upon a platform forming a part of a framework which includes the brackets 4. This framework with the mechanism supported thereby is adapted to be attached to the frame of an ordinary planter by resting the platform upon the upper edges of the furrow openers with the brackets depending adjacent to said furrow openers. The brackets are subsequently secured to the furrow openers to hold the platform in place by means of screws, nails or other fastening devices. In the drawings, the furrow openers are shown solid throughout, and hence in order to provide for the operation of the crank shaft and the operating shaft which is carried thereby, said furrow openers are provided with segmental slots through which the operating shaft extends, said slots being concentric with the crank shaft. It is obvious that when the apparatus is used in connection with furrow openers which are not solid throughout, there may be sufficient space in the openings thereof, to allow the necessary freedom of movement of the said shafts.

It will be understood that various changes in the form, proportion, and the minor details of construction may be resorted to without departing from the spirit of the invention or sacrificing any of the advantages thereof.

Having described my invention, what I claim is—

1. A check-row attachment for corn-planters, the same comprising a platform, adapted to rest upon the frame of a planter, seed-slide operating-mechanism arranged upon the platform, angular side-brackets depending from the edges of the platform, a rock-shaft journaled in bearings in said brackets and provided with crank-arms arranged outside the planes of the brackets, an operating-shaft mounted in bearings at the extremities of the said crank-arms, operating wheels carried by the operating-shaft, means for adjusting the rock-shaft to alter the elevation of the operating-shaft, and connections between the operating-shaft and the said seed slide-operating mechanism, substantially as specified.

2. In a check-rower, the combination with an operating shaft, and means for driving the same, of a driving sprocket operatively connected to said shaft and having its axis arranged in a horizontal plane, a check-row chain carried by said sprocket, and an idle pulley spaced thereupon, check-row levers arranged in the path of a projection carried by said chain, rock-shafts carrying said lever, a seed-slide, an oscillating lever connected with the seed-slide and having an adjustable pivotal point, and connecting rods or pitmen adjustably connected at their extremities to the oscillating lever, and arms on said rock-shafts, substantially as specified.

3. The combination with an operating shaft, of an operating-wheel provided with an annular lateral flange having spaced perforations, and sockets or keepers in alignment with the perforations, spikes fitting in said perforations and sockets or keepers, set-screws for securing the spikes at the desired adjustment, a marker-wheel loosely mounted upon the said shaft contiguous to the operating-wheel and having a peripheral lateral internally toothed rim, a marker carried by said wheel, and pawls mounted upon the operating-wheel to engage the teeth of said rim on the marker-wheel, substantially as specified.

4. In a check-rower, the combination with an operating shaft, planting mechanism, and connections between the shaft and the planting mechanism, of marker wheels carried by said shaft and provided with projections 24, and signal springs 26 arranged with their free ends in the paths of said projections and adapted when released by the projections to strike the said wheels, substantially as specified.

In testimony that I claim the foregoing as my own I have hereto affixed my signature in the presence of two witnesses.

ORLAN T. WOOD.

Witnesses:
C. S. POLK,
R. W. BROWN.